No. 864,797. PATENTED SEPT. 3, 1907.
H. L. PHELPS.
SEAM TRIMMER THROAT PLATE FOR SEWING MACHINES.
APPLICATION FILED NOV. 3, 1906.

WITNESSES:
J. S. Finch
A. Donihue

INVENTOR.
HERBERT L. PHELPS
BY
F. H. Ostrom
ATTORNEY.

UNITED STATES PATENT OFFICE.

HERBERT L. PHELPS, OF CHICAGO, ILLINOIS, ASSIGNOR, BY MESNE ASSIGNMENTS, TO THE SINGER MANUFACTURING COMPANY, A CORPORATION OF NEW JERSEY.

SEAM-TRIMMER THROAT-PLATE FOR SEWING-MACHINES.

No. 864,797.  Specification of Letters Patent.  Patented Sept. 3, 1907.

Application filed November 3, 1906. Serial No. 341,957.

*To all whom it may concern:*

Be it known that I, HERBERT L. PHELPS, a citizen of the United States, and a resident of Chicago, in the county of Cook and State of Illinois, have invented certain new and useful Improvements in Seam-Trimmer Throat-Plates for Sewing-Machines, of which the following is a specification.

This invention relates to improvements in sewing machine seam trimmer throat plates, and has for its object to provide improved means for guiding the trimmer blade and for holding its cutting edge in proper relationship with the ledger trimmer plate.

In the earlier forms of construction it has been the common practice to locate the pivotal point of the trimmer blade guard at the side of the trimming line opposite to that upon which the trimming edge of the ledger trimmer plate is located, and in such forms of construction the entrance of the trimmer blade between the trimming edge of the ledger plate and trimmer blade guard causes the guard to be moved at such an angle to the trimming edge of the ledger plate that the pressure exerted by the guard is directed against the rear or heel portion of the trimmer blade. In my present invention, the pivotal point of the guard is located upon the same side of the trimming line as the trimming edge of the ledger trimmer plate, which causes the trimmer blade to move the guard so that its coacting wall lies in a line substantially in line with the trimming edge of the ledger plate, thereby causing the acting wall of the guard to act upon a greater surface of the trimmer blade, and in advance of its heel portion, thus effecting a more accurate guiding of the trimmer blade relatively to the trimming edge of the ledger plate.

Figure 1:
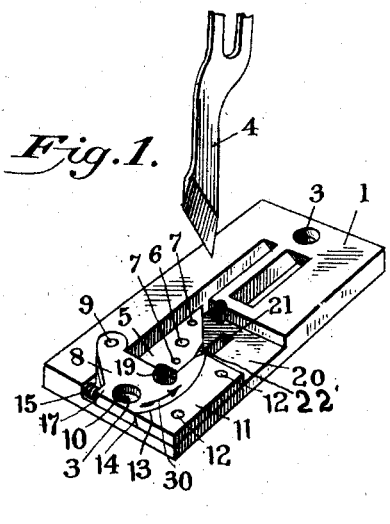
Figure 2:
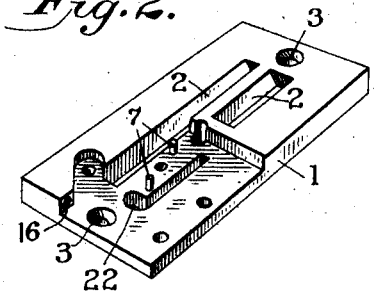
Figure 3:
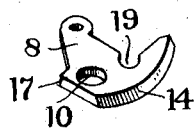
Figure 4:
Figure 5:
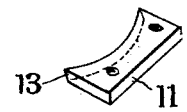
Figure 6:
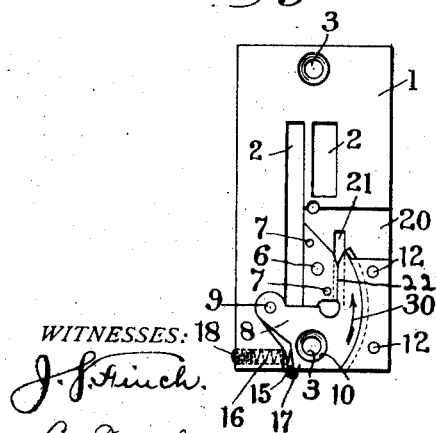
Figure 7:
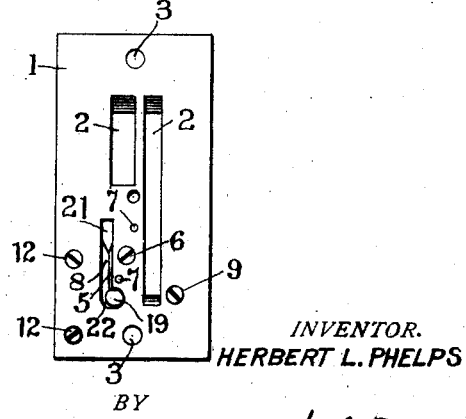

In the accompanying drawings illustrating my invention, in the several figures of which like parts are similarly designated, Figure 1 is a view in perspective of a sewing machine throat plate provided with my improved mechanism, together with the trimmer blade, Fig. 2, a view in perspective of the throat plate only, Fig. 3, a detail in perspective of the trimmer blade guard, Fig. 4, a perspective view of the ledger trimmer plate, Fig. 5, a view in perspective of the knife guard plate, Fig. 6, a plan view of Fig. 1, and Fig. 7 an underside or bottom view of Fig. 6.

1 is the throat-plate and 2, 2, are openings for the action of the commonly employed feed dogs.

3, 3, are holes through which pass the commonly employed throat-plate screws for securing the throat-plate to the cloth-plate of the sewing machine, 4 is the trimmer blade and 5 is the ledger trimmer plate secured, by screw 6 and pins 7, 7, to the throat-plate 1.

8 is the trimmer blade guard secured, by pivot screw 9, to the throat-plate 1 and provided with an opening 10 through which passes one of the throat-plate screws.

11 is the trimmer blade guard plate secured, by screws 12, 12, to the throat-plate 1 and provided with an undercut circular portion 13, which latter coacts with a beveled portion 14 formed on the guard 8 to hold said guard down upon the throat-plate.

15 is a spring seated in a pocket 16, formed in the throat-plate 1, which spring acts against a heel 17, formed on the guard 8, to hold said guard resiliently in the direction indicated by the arrow 30.

18 is a screw for adjusting the spring 15, and 19 is a cut out portion in the guard 8 for the passage of lint and small cuttings incident to the trimming action of the trimmer blade.

20 is a seat for a binder head, incidentally shown for the reason that it was a feature of the model plate from which the drawings were made.

21 is an opening in the throat-plate for the passage of the trimmer blade 4 and provided at its forward end with a circular opening 22 which registers with the opening 19 in the guard 8.

While I have shown the ledger trimmer plate as consisting of a piece of metal secured to the throat-plate, it is to be understood that while this is desirable, it is not essential, as the trimming edge 22' of the ledger trimmer plate might be formed integral with the throat-plate, as has been common in connection with the earlier forms of construction.

What I claim is:—

1. In a seam trimmer throat-plate for sewing machines, the combination of a ledger trimmer plate having a trimming edge and a trimmer blade guard, the latter pivoted on the same side of the trimming line as the trimming edge of the ledger trimmer plate is located.

2. In a seam trimmer throat-plate for sewing machines, the combination of a ledger trimmer plate having a trimming edge, a trimmer blade guard pivoted on the same side of the trimming line as the trimming edge of the ledger trimmer plate is located, and a trimmer blade guard plate, said blade guard and guard plate provided with coacting circular portions to hold said guard down upon the throat-plate.

3. In a seam trimmer throat-plate for sewing machines, a ledger trimmer plate having a trimming edge, a trimmer blade guard pivoted on the same side of the trimming line as the trimming edge of the ledger trimmer plate is located, and a trimmer blade guard plate, said blade guard and guard plate provided with coacting circular portions, in combination with a spring to hold said guard pressed in the direction of the ledger trimmer plate.

Signed at city of Chicago in the county of Cook and State of Illinois this 23d day of October A. D. 1906.

HERBERT L. PHELPS.

Witnesses:
W. D. CARNAHAN,
D M. GREGORY.